US006839730B1

(12) United States Patent
Ramabhadran (10) Patent No.: US 6,839,730 B1
(45) Date of Patent: Jan. 4, 2005

(54) METHOD AND SYSTEM FOR EFFICIENTLY MATCHING EVENTS WITH SUBSCRIBERS IN A CONTENT-BASED PUBLISH-SUBSCRIBE SYSTEM

(75) Inventor: Narayanan S. Ramabhadran, Bangalore (IN)

(73) Assignee: Novell, Inc., Provo, UT (US)

( * ) Notice: Subject to any disclaimer, the term of this patent is extended or adjusted under 35 U.S.C. 154(b) by 888 days.

(21) Appl. No.: 09/616,498

(22) Filed: Jul. 14, 2000

(51) Int. Cl.[7] .............................................. G06F 15/16
(52) U.S. Cl. ............................ 709/201; 707/3; 707/10
(58) Field of Search ............................ 709/201; 707/3, 707/10, 1, 103, 200–206

(56) References Cited

U.S. PATENT DOCUMENTS

| | | | | |
|---|---|---|---|---|
| 5,659,725 A | * | 8/1997 | Levy et al. ..................... | 707/3 |
| 6,065,009 A | * | 5/2000 | Leymann et al. ............. | 707/10 |
| 6,091,724 A | * | 7/2000 | Chandra et al. ............ | 370/390 |
| 6,108,645 A | * | 8/2000 | Eichstaedt et al. ............. | 707/1 |
| 6,169,989 B1 | * | 1/2001 | Eichstaedt et al. .......... | 707/100 |
| 6,216,132 B1 | * | 4/2001 | Chandra et al. ........ | 707/103 R |
| 6,725,227 B1 | * | 4/2004 | Li .............................. | 707/102 |

OTHER PUBLICATIONS

"Design of a Scalable Event Notification Service: Interface and Architecture", by Carzaniga et al., University of Colorado, Technical Report CU–CS–863–98, Aug. 1998, pp. 1–16.
"Achieving Scalability and Expressiveness in an Internet–Scale Event Notification Service", by Carzaniga, et al., University of Colorado and University of California, pp. 1–10.
"Elvin has left the building: A publish/subscribe notification service with quenching", by Segall, et al., University of Queensland, Australia, pp. 1–12.
"An Efficient Multicast Protocol for Content–Based Publish–Subscribe Systems", by Banavar, et al., IBM T. J. Watson Research Center, pp. 1–9.
"Java Message Service™", Sun Microsystems, Version 1.0.2, Nov. 9, 1999, pp. 1–109.
Matching Events in a Content–based Subscription System, by Aguilera, et al., Nov. 10, 1998, pp. 1–17.
"Symbolic Boolean Manipulation with Ordered Binary Decision Diagrams", by Randal E. Bryant, Carnegie–Mellon University, CMU–CS–92–160, Jul. 1992, pp. 1–33.
"Graph–Based Algorithms for Boolean Function Manipulation", by Randal E. Bryant, Carnegie–Mellon University, pp. 1–25.
Representing Boolean Functions with If–Then–Else DAG's, by Kevin Karplus, University of California, Santa Cruz, UCSC–CRL–88–28, Nov. 30, 1998, pp. 1–21.

* cited by examiner

Primary Examiner—Hosain Alam
Assistant Examiner—Shabana Qureshi
(74) Attorney, Agent, or Firm—Haynes and Boone, LLP (57) ABSTRACT

A method is provided for efficiently solving the matching problem in content-based publish-subscribe systems. Subscribers may define arbitrary boolean predicates as conditions to subscribe to the published event. The subscribers and their predicates can be organized in the form of a virtual Direct Acyclic Graph (DAG) such that a traversal of the DAG yields one or more matching subscribers. The present invention improves upon the conventional method of linearly matching individual subscribers against an event.

12 Claims, 4 Drawing Sheets

METHOD AND SYSTEM FOR EFFICIENTLY MATCHING EVENTS WITH SUBSCRIBERS IN A CONTENT-BASED PUBLISH-SUBSCRIBE SYSTEM

BACKGROUND OF THE INVENTION

The present invention relates generally to computer software, and more particularly, to a system and method for efficiently matching events with subscribers in a content based publish-subscribe system.

The expansion of local and wide area computer networks has pushed computer technologies to a level that must be adaptive to a distributed environment. Computer applications can be concurrently running on different nodes in a large scale network, and in this environment, a coherent multi-event management system can create synergistic results and is an essential element to the networked computers. It is known in the art that a publish-subscribe paradigm is one of simple and efficient techniques to interconnect applications in a distributed environment. Information providers (publishers) publish information in the form of events in a publish-subscribe system, which delivers these events to the information consumers (subscribers). The system acts as an intermediary between the publishers and subscribers and is typically implemented as a network broker which is responsible for routing events from publishers to subscribers. Most publish-subscribe systems support some mechanisms by which subscribers can specify what kind of events they are interested in receiving. In such systems, each event is categorized as belonging to a particular group. Subscribers can then indicate the groups to which they want to subscribe. The publish-subscribe system ensures that subscribers are notified of events belonging to their respective groups. These systems are also known as group based systems.

In addition to group based systems, there are content-based publish-subscribe systems. A content-based publish-subscribe system allows a subscriber to control which events it wishes to be notified. Events in such a system have various attributes and subscribers can specify arbitrary boolean predicates over these attributes. A subscriber is notified of an event only if the predicates specified by the subscriber are satisfied. For example, a simple event for a stock quote could possibly have two attributes: the NAME and PRICE. A subscriber could specify the following predicate (NAME= "XYZ") AND (PRICE>20). That is, this subscriber would be notified of the related event only if the NAME attribute of the event is "XYZ" and its PRICE attribute is greater than 20. Compared to group based systems, content-based systems provide subscribers with great flexibility in choosing events for notification. A good example of a publish-subscribe system supporting content-based subscription is the Java Message Service, which is a messaging middleware standard that allows subscribers to specify SQL92 predicates over message attributes.

Knowing all the advantages that content-based publish-subscribe systems have, an important problem in designing and implementing a content-based publish-subscribe system is an event-subscriber matching problem. In a networked environment, given an event and a set of subscribers, the problem is to determine, as efficiently as possible, a subset of the subscribers that "match" with the event, i.e., those subscribers whose predetermined predicates are satisfied by the given published event.

A conventional approach would be individually testing the event against the predetermined predicates specified by each subscriber one at a time until all the predicates are tested. Such an approach is a "linear" approach and would not be scalable. A large system may have thousands of subscribers and millions of events at any moment, and the time spent to match the events with the subscribers can be significant.

Some experts in the industry suggest a solution to the matching problem, where subscriptions are organized into a matching tree, whose traversal yields a set of subscribers matching a particular event. See Marcos K. Aguilera, Robert E. Strom, Daniel C. Sturman, Mark Astley, and Tushar D. Chandra, *Matching Events in a Content-Based Subscription System*, Principles of Distributed Systems (1999). However in the *Matching Events* article, subscriptions are limited to conjunctions of atomic tests. The teaching of this article bases on the premise that any boolean predicate can be transformed into a disjunction of conjunctions. For example, a simple test (A OR B)

can be transformed into (A AND B) OR (A AND NOT B) OR (NOT A AND B)

For transforming an arbitrary boolean predicate into a correct form such as the above example, the process involved can be extensive and costly in terms of time and processing capacity. Moreover, a Directed Acyclic Graph (DAG) constructed for the original test can be expanded exponentially due to the increase of tests caused by the transformation.

Furthermore, conventional binary decision diagrams and If-Then-Else DAGs primarily address the problem of finding an efficient representation for boolean expressions (including sub expressions), and they are widely used in design and verification of logic circuits. In applying these techniques for constructing DAGs, it is more a bottom-up approach and the emphasis is on sharing all possible sub expressions or low level expressions.

Although such a representation could be used to solve the matching problem, such an approach would still be linear. Moreover, sharing sub-predicates that are common prefixes is likely to result in sub-linear complexity.

What is needed is an efficient method to solve the matching problem for subscriptions, which are arbitrary boolean predicates that can make use of standard boolean operators AND, OR and NOT and parenthesis, in a content-based publish-subscribe system situated in a distributed network environment.

SUMMARY OF THE INVENTION

A method and system is provided for matching an event with a group of subscribers in a content-based publish-subscribe system in a distributed computer network environment. In one embodiment, each subscriber of the system is allowed to define one or more predetermined predicates or specified filters to screen the events it receives. These predicates define matching tests using standard boolean connectors such as AND, OR and NOT. Parenthesis can also be used to modify the order of these tests. A subscriber matches an event if the predicates supplied by the subscriber are all satisfied.

In one example of the present invention, a suitable virtual Direct Acyclic Graph (DAG) is built based on the predicates of the subscribers. The DAG has a root node, one or more leaf nodes representing subscribers, and one or more non-leaf nodes representing the boolean tests.

Upon publishing an event, the event is considered as an input, and the DAG is traversed. One or more subscribers are eliminated if any of their predicates represented by the boolean tests are not satisfied while the DAG is traversed, and eventually, at least one matching subscriber is identified if all the predicates of the matching subscriber are satisfied, The DAG is built in such a fashion that commonly shared predicates among subscribers are tested first so that a minimum number of boolean tests are conducted for finding a matching subscriber.

DETAILED DESCRIPTION

The present disclosure provides a method and system for efficiently matching events with subscribers in a content-based publish-subscribe system. This can be performed, for example, on a computer 100.

A computer graphics processing system includes a two-dimensional graphical display (also referred to as a "screen") and a central processing unit. The central processing unit contains a microprocessor and random access memory for storing programs. A disk drive for loading programs may also be provided. A keyboard having a plurality of keys thereon is connected to the central processing unit, and a pointing device such as a mouse is also connected to the central processing unit. It will also be understood by those having skill in the art that one or more (including all) of the elements/steps of the present invention may be implemented using software executing on a general purpose computer graphics processing system, using special purpose hardware-based computer graphics processing systems, or using combinations of special purpose hardware and software.

In one example of the present invention, a virtual Directed Acyclic Graph (DAG) is first constructed for programming purpose. The DAG has one or more branches leading to one or more nodes, and each node in the DAG has a matching test to be performed. The nodes that do not have any branch directed away from them are end nodes. They are also referred to as leaf nodes, representing the subscribers. The DAG has a root node from which a matching process, which contains a series of matching tests, starts. An event, as an input, is evaluated or matched by starting the matching tests from the root node of the DAG and proceeding downward until each leaf node is reached. The conventional approach for constructing a DAG is done in a bottom-up fashion, which focuses on sharing sub-predicates that are common prefixes, and are likely to result in sub-linear complexity. The present invention introduces a top-down fashion for constructing the DAG suited for the matching problem in content-based publish-subscribe systems.

At each non-leaf node, corresponding tests pertinent to it are evaluated, and depending on the result of the tests, the matching process continues through one or more outward branches. On reaching a leaf node, the corresponding subscriber is added to the list of "matched" subscribers for that event. In essence, the matching process preprocesses the subscription information into a suitably constructed DAG. Thereafter, a traversal of the DAG for a particular event yields the list of subscribers matching with that particular event.

After the DAG is constructed, the root node usually is a dummy test that always produces a value of TRUE so that the matching process can start to flow downward. Starting from the root node, the test at a non-leaf node is always executed. Each non-leaf node has branches directed outward which are labeled with one of T, F, $T_\phi$, or $F_\phi$. T denotes branches to be followed if the test evaluates to a logic value of TRUE. F denotes branches to be followed if the test evaluates to a logic value of FALSE. $T_\phi$ denotes branches to be followed if the test evaluates to either TRUE or NULL. $F_\phi$ denotes branches to be followed if the test evaluates to either FALSE or NULL. These labels denote which branches are to be followed depending on the outcome of the test performed at the node. Thus if the test evaluates to be TRUE, all branches labeled with T and $T_\phi$ are followed. If the test evaluates to FALSE, all branches labeled with F and $F_\phi$ are followed. If the test evaluates to NULL, all branches labeled with $T_\phi$ and $F_\phi$ are followed. When a leaf node is reached, the corresponding subscriber is matched.

The non-leaf nodes representing atomic tests that can be evaluated against an event are formed by using standard boolean operators AND, OR and NOT. For example, (NAME='NOVELL') and (PRICE>20) are sample elementary tests, each rendering a single logic result. The result can be TRUE, FALSE, or NULL. A test may evaluate to a value of NULL if for some reason the test cannot be evaluated against a particular event. For example, a particular event may not contain any attribute called NAME in which case the test (NAME='NOVELL') evaluates to NULL. Furthermore, parenthesis can be used to modify the order of evaluations of the predicates. For instance, the above mentioned two elementary tests can be combined with boolean operator AND to yield the predicate (NAME='NOVELL') AND (PRICE>20) to form a more complex test. Table 1–3 as shown below illustrate predefined logical test results when standard boolean operator AND, OR and NOT are used.

TABLE 1

| AND   | true  | false | null  |
|-------|-------|-------|-------|
| true  | true  | false | null  |
| false | false | false | false |
| null  | null  | false | null  |

TABLE 2

| OR    | true | false | null |
|-------|------|-------|------|
| true  | true | true  | true |
| false | true | false | null |
| null  | true | null  | null |

TABLE 3

| NOT   |       |
|-------|-------|
| true  | false |
| false | true  |
| null  | null  |

A subscriber therefore matches an event if the predicate supplied by the subscriber evaluates to a value of TRUE for that event.

An appropriate DAG is important for a successful matching on the content-based publish-subscribe system. The DAG should be constructed so that during a traversal of the DAG for a particular event, only those leaf nodes which correspond to subscribers and match that event are reached. An important idea behind the construction of the DAG is to exploit common tests and sub-predicates among the subscribers. The DAG is constructed such that, for subscribers with a predicate as a common prefix, the predicate is evaluated in minimum occurrences (if not once) for all subscriptions having the sam epredicate. The benefit of such a DAG is that with the shared prefixes, a test performed at each node effectively eliminates some subgroup of the subscribers under test. That is, starting from the root, each test performed successively "prunes" a subset of subscribers eligible for matching until only the subscribers that match exactly with the event are reached. Therefore, this technique greatly improves upon the conventional approach of individually matching subscribers with events.

Figure 1:
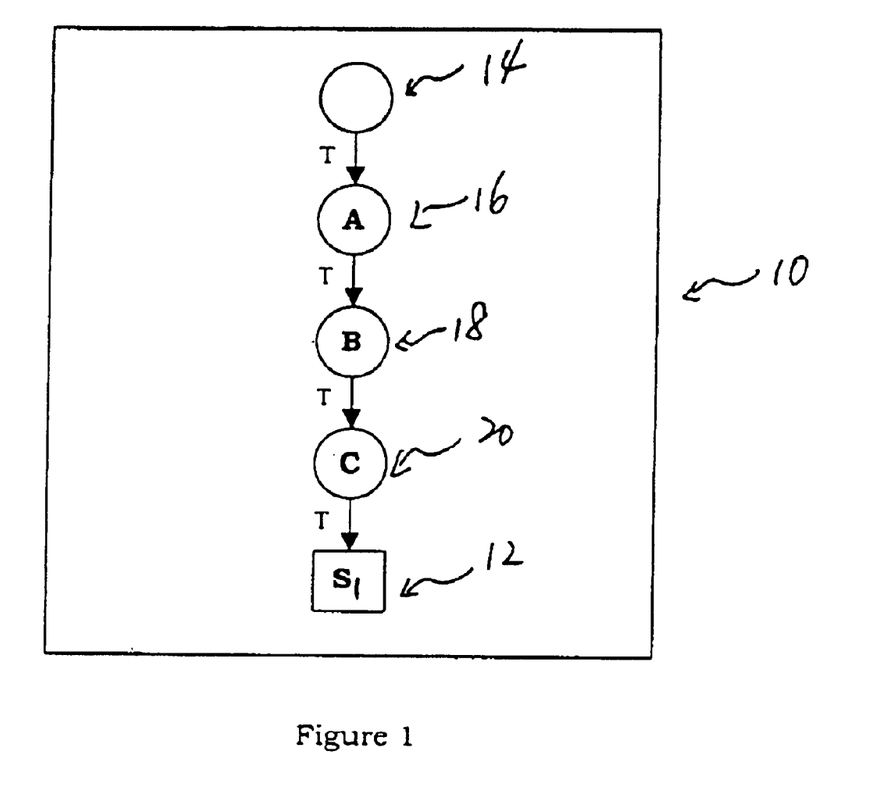
FIGS. 1–4 illustrate different Direct Acyclic Graphs for solving matching problems in a content-based publish-subscribe system.

Referring to FIG. 1, one example of a DAG 10 is shown, illustrating a matching process for assisting a subscriber to match an event based on its predetermined predicates. In this case, a single subscriber SI has the predicate (A AND B AND C), where A and B are elementary tests. Starting at a root node 14, which is a dummy test that always evaluates to a value of TRUE, the matching process proceeds to a node 16 where test A is evaluated. If it evaluates a value of FALSE or NULL, the matching process stops. If it evaluates a value of TRUE, it proceeds further to a node 18 with test B. Similarly, after B is evaluated and if the outcome is still TRUE, the process proceeds to a node 20. If that test still renders a TRUE value, the leaf node 12 representing the subscriber $S_1$ 12 is reached and the event is matched. On the contrary, if any test of the node 16, 18, or 20 does not evaluate to a TRUE value, the matching process stops at that node and does not reach the leaf node 12 for $S_1$ for this particular event.

Figure 2:
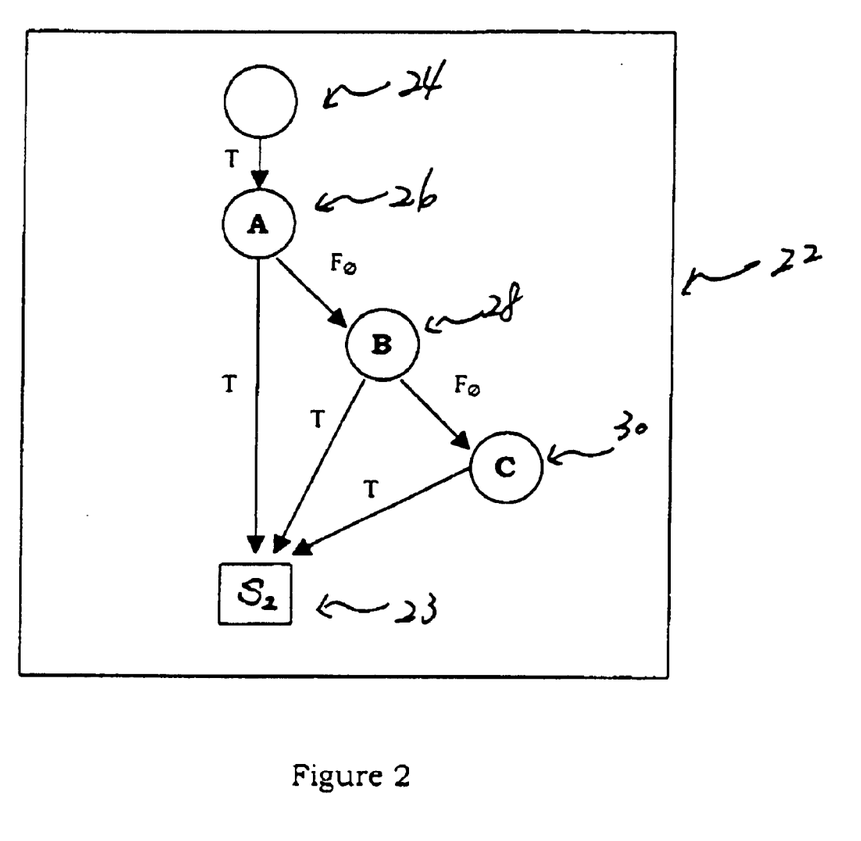

Referring now to FIG. 2, another DAG 22 matches an event with a subscriber S2. In this example, the subscriber $S_2$ 23 has predicates (A OR B OR C), where A, B and C are atomic tests. From a root node 24, the node 26 is first reached for conducting test A. If the evaluation renders a value of TRUE, the matching process proceeds straight to a leaf node 23, which indicates that S2 is matched with the event. Otherwise, if a value of FALSE or NULL is reached in node 26, the matching process arrives at node 28 to execute test B. Again, if the test renders a TRUE value, S2 is once more matched with the event. However, if the node 28 produces a result of FALSE or NULL, a node 30 representing test C is further reached. At that node, if a value of TRUE is obtained, the matching process can reach node 23 and S2 is found to be a matching subscriber. It is noted that although this particular DAG 22 is constructed in such a way that test A, B and C are evaluated sequentially, the position of these tests are interchangeable.

Figure 3:
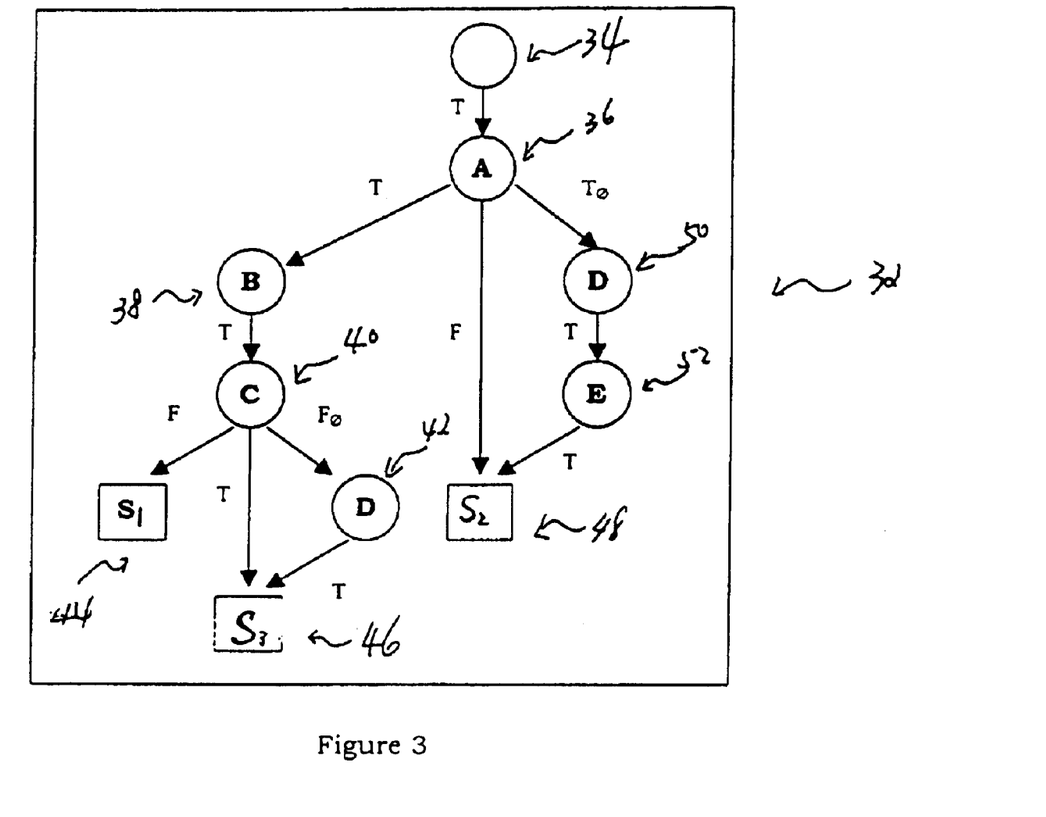
Figure 4:
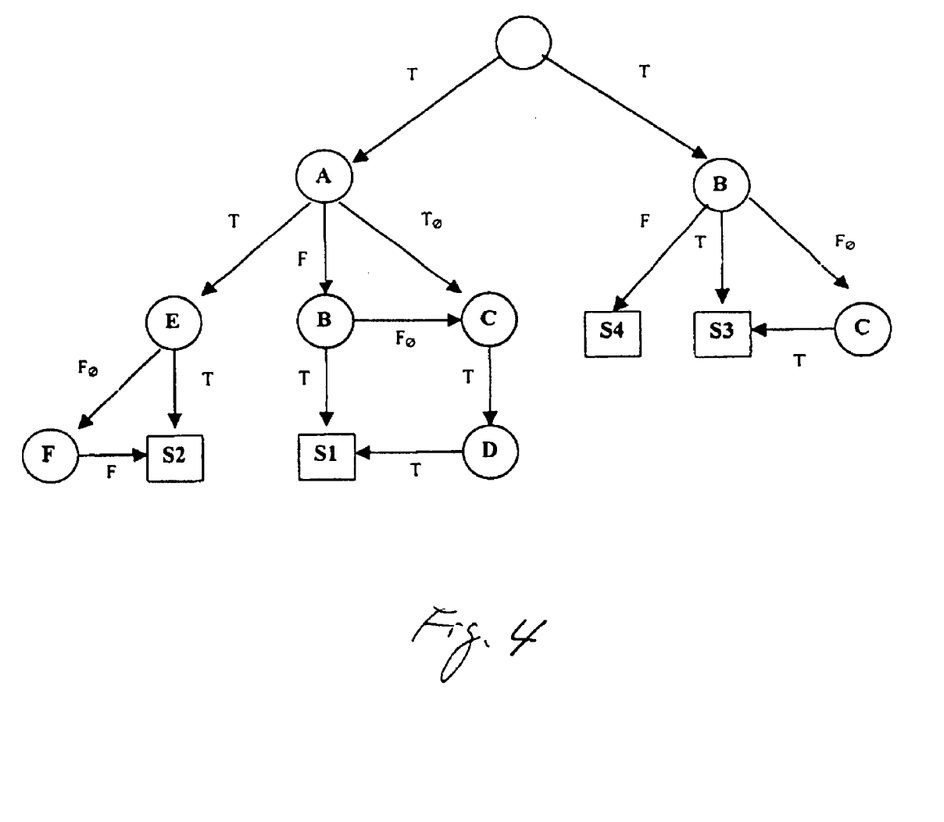

FIG. 3 illustrates a more complicated DAG 32 where subscribers S1, S2, and S3 have different subscription predicates, some portion of which are commonly shared. More specifically, S1 has a predicate of (A AND B AND NOT C), S2 has a predicate of (NOT A OR D AND E), and S3 has a predicate of (A AND B AND (C OR D)). In order to construct an optimal DAG, common tests and sub-predicates must be exploited for constructing the DAG. For S1, S2 and S3, test A is a common prefix for all three subscriptions, and it should be placed right after a root node 34. Hence, a node 36 represents test A immediately after the root node 34. Similarly, predicate (A AND B) is shared by S1 and S3, so test B should be placed immediately after the node 36 at node 38. Consequently, predicate (A AND B) is only evaluated once in the process for matching both S1 and S3. The obvious benefit of this method is that the test performed at each node is used to try and effectively elminate some fraction of the subscribers. For example, if test A in DAG 32 evaluates to a FALSE, both S1 and S3 are eliminated immediately without further processing. In a fashion similar to the processes as described in FIGS. 1 and 2, S1 (node 44) is matched with the event when node 40 representing test C gives a FALSE value, and S3 (node 46) is matched if either the node 40 evaluates to a TRUE or the node 40 evaluates to a FALSE or NULL and the node 42 further evaluates to a TRUE. S2 (node 48), is matched if test A renders a FALSE, or through a longer path that traverses nodes 50 and 52.

The above examples are straightforward with only a few subscribers and simple predicates, but the technique holds valid for a large number of subscribers with arbitrarily complex predicates as well. This approach significantly improves upon the conventional matching process which is designed to traverse each subscription for match indivial subscriber. The actual algorithmic details of constructing the DAG are further explained below in the context of a computer program.

Subscriptions are represented by a DAG G=(V, E) where V is the set of vertices (nodes) and E is the set of edges of the DAG. Each internal node "u" represents a test "u.test" to be performed on an event and each leaf node u represents a subscriber "u.sub." Each edge $e \in E$ is of the form (u, r, v) where u, $v \in V$, and $r \in \{T, F, T_\phi, F_\phi,\}$ is a label associated with that edge. The edge is directed from u to v. During traversal, the node v should be visited depending on the result of the test u.test. Edges labeled T lead to subscribers that potentially match if the test evaluates TRUE. Edges labeled $T_\phi$ lead to subscribers that potentially match if the test evaluates to TRUE or NULL. Edges labeled F lead to subscribers that potentially match if the test evaluates to FALSE. Edges labeled $F_\phi$ lead to subscribers that potentially match if the test evaluates FALSE or NULL.

DAG Creation

The root of the DAG, represented by "G.root" in the following section of the computer program, is a node which represents a dummy test that always returns TRUE when evaluated against any event. When the DAG is initially created with no subscribers,.the root of the DAG is created with the dummy test. Therefore, the sample computer code for creating a DAG "G" is as follows:

```
CreateDAG(G)
  G.root=new Internal Node
  G.root.test=DummyTest
  V={G.root}
  E={ }
```

DAG Traversal

The visit(u, event) function in the following section of the computer program is a recursive function that visits a node u in the DAG for a particular event. On reaching a leaf node, the subscriber represented by that leaf node is matched and processed. On reaching an internal node, the test at that node is evaluated against the event. If the test evaluates TRUE, edges labeled T and $T_\phi$ are followed. If the test evaluates FALSE, edges labeled F and $F_\phi$ are followed. If the test evaluates NULL, edges labeled $T_\phi$ and $F_\phi$ are followed. The program is as follows:

```
Visit(u, event)
  if (u is a leaf node)
    process u.sub which matches event
  else
    if (u.test(event)=true)
      ∀(u, T, v) ∈ E
        visit(v, event)
      ∀(u, T_φ, v) ∈ E
```

```
      visit(v, event)
  else
  if (u.test(event)=false)
    ∀(u, F, v) ∈ E
      visit(v, event)
    ∀(u, F_φ, v) ∈ E
      visit(v, event)
  else
    ∀(u, T_φ, v) ∈ E
      visit(v, event)
    ∀(u, F_φ, v) ∈ E
      visit(v, event)
```

When an event "e" occurs, the following section of the computer program is invoked, which starts the matching of the event from the root of the DAG.

```
Match(G, event)
  visit(G.root, event)
```

This results in a depth-first traversal of the DAG. Only those leaf nodes with subscribers matching the event are traversed.

Creating the DAG from Subscriptions

Construction of the DAG is done incrementally. New subscriptions are added onto an existing DAG as described below.

A subscription is a boolean predicate on events. A predicate may be just an atomic test, a disjunction of other predicates (predicates connected by a logical OR), a conjunction of other predicates (predicates connected by a logical AND), or a negation (NOT) of a predicate. A predicate is added to the DAG by recursively adding the subpredicates it comprises of. The following function of the computer program accomplishes this task:

```
ProcessPredicate(P, InSet)
  if (P is a conjunction)
    return ProcessConjunction(P, InSet)
  else
  if (P is a disjunction)
    return ProcessDisjunction(P, InSet)
  else
  if (P is a negation)
    return ProcessNegation(P, InSet)
  else
    return ProcessAtomicTest(P, InSet, true)
```

The above function takes a predicate P and a set InSet as parameters. Depending on whether P is a conjunction, disjunction, negation or an atomic test, it invokes the appropriate function. InSet may be viewed as the set of points in the DAG that can potentially be reached after a partial match of the subscription. To further determine whether the subscription matches or not, it is necessary to evaluate predicate P, and hence P must be added to the DAG at each point in InSet. The function returns two sets of points in the DAG: TSet and $F_\phi$ Set. Assuming that the matching of an event has reached some point in InSet, TSet is the set of points in the DAG that can potentially be reached, depending on the event, if and only if predicate P evaluates to TRUE. Similarly, assuming that the matching of an event has reached some point in InSet, $F_\phi$ Set is the set of points in the DAG that can potentially be reached, depending on the event, if and only if predicate P does not evaluate to TRUE i.e. predicate P evaluates to either FALSE or NULL. To formalize the notion of "point" in the DAG, it consists of a pair (u, r) where u ∈ V and r ∈ {T, F, $T_\phi$, $F_\phi$}. During the matching of an event, (u, r) is reached if ∀(u, r, v) ∈ E, the node v is visited.

The following function ProcessConjunction(C, InSet) adds a conjunction C to all points in the set InSet:

```
ProcessConjunction(C, InSet)
/* C=C_1 AND C_2 AND ... AND C_k */
  TSet={ }
  F_φ Set={ }
  TSet_0=InSet
  i=1
  while (i<=k)
    [TSet_i, F_φ Set_i]=ProcessPredicate(C_i, TSet_{i+1})
    F_φ Set=F_φ Set∪F_φ Set_i
    i=i+1
  TSet=TSet_k
  return [TSet, F_φ Set]
```

Conjunction C consists of sub-predicates $C_1, C_2, \ldots, C_k$. Each sub-predicate is recursively added to the DAG, starting with $C_1$ at all points in InSet. Since a conjunction evaluates to TRUE, if and only if all sub-predicates evaluate to TRUE, each sub-predicate $C_i$ (i>1) is recursively added only at points in the DAG where $C_{i-1}$ evaluates to true i.e. $TSet_{i-1}$. Therefore TSet is the set of points where all sub-predicates evaluate to FALSE or NULL i.e. $TSet_k$. Similarly, a conjunction evaluates to FALSE or NULL, if and only if one or more of its sub-predicates evaluates to FALSE or NULL. Therefore the set $F_\phi$ Set is the union of all the sets $F_\phi$ $Set_i$. The concept is illustrated by FIG. 1, which represents the subscription A AND B AND C. Note that B is added at the point where A is TRUE, and similarly C is added at the point where B is TRUE. In this case, A, B and C are atomic tests but the procedure is the same even if they are arbitrary predicates, except that they are recursively added.

The following function ProcessDisjunction(D,InSet) adds a disjunction D to all points in the set InSet:

```
ProcessDisjunction (D, InSet)
/* D=D_1 OR D_2 OR ... OR D_k */
  TSet={ }
  F_φ Set={ }
  F_φ Set_0=InSet
  i=1
  while (i<=k)
    [TSet_i, F_φ Set_i]=ProcessPredicate(D_i, F_φ Set_{i-1})
    TSet=TSet∪TSet_i
    i=i+1
  F_φ Set=F_φ Set_k
  return [TSet, F_φ Set]
```

Disjunction D consists of sub-predicates $D_1, D_2, \ldots, D_k$. Each sub-predicate is recursively added to the DAG, starting with $D_1$ at all points in InSet. Since a disjunction evaluates to FALSE or NULL, if and only if all sub-predicates evaluate to FALSE or NULL, each sub-predicate $D_i$ (i>1) is recursively added only at points in the DAG where $D_{i-1}$ evaluates to FALSE or NULL, i.e. $F_\phi$ $Set_{i-1}$. Therefore $F_\phi$ Set is the set of points where all sub-predicates evaluate to FALSE or NULL i.e. $F_\phi$ $Set_k$. Similarly, a disjunction evaluates to TRUE, if and only if one or more of its sub-predicates evaluates to TRUE. Therefore the set TSet is the union of all the sets $TSet_i$. Taking a DAG representing (A OR B OR C) as an example. B is added at the point where A is either FALSE or NULL, and C is added at the point where B is either FALSE or NULL. In this case, A, B and C are atomic tests, but the procedure is the same even if they are arbitrary predicates, except that that are be recursively added.

The following function ProcessNegation(N, Inset) adds a negation to all points in InSet. It makes use of standard boolean identities to transform a negated conjunction into a disjunction (and vice versa) and calls the appropriate function:

```
ProcessNegation(N, InSet)
  if (N=NOT D where D=D₁ OR D₂ OR . . . OR Dₖ)
    C=(NOT D₁) AND (NOT D₂) AND . . . AND (NOT Dₖ)
    return ProcessConjunction(C, InSet)
  else
  if (N=NOT C where C=C₁ AND C₂ AND . . . AND Cₖ)
    D=(NOT C₁) OR (NOT C₂) OR . . . OR (NOT Cₖ)
    return ProcessDisjunction(D, InSet)
  else
  if (N=NOT N' where N'=NOT P)
    return ProcessNegation(N', InSet)
  else
  /* N=NOT T where T is an atomic test */
  return ProcessAtomicTest(T, InSet, false)
```

The following function ProcessAtomicTest(test, InSet, result) adds an atomic test to all points in InSet. It takes an additional parameter result, which is FALSE if the test is negated, and TRUE otherwise.

```
ProcessAtomicTest(test, InSet, result)
P=InSet
Q={ }
R={ }
while (P is not empty)
  let (u, r) ∈ P
  if (∃v ∈ V|(u, r, v)∈E and v.test=test)
    let Pᵥ={(u', r'):(u', r', v) ∈ E}
    if (Pᵥ⊆P)
      R=R∪{v}
    else
      v'=new Internal Node
      v'.test=test
      V=V∪{v'}
      ∀(v, s, w) ∈ E
        E=E∪{(v', s, w)}
      ∀(u', r') ∈ Pᵥ∩P
        E=E\{(u', r',v)}∪{(u', r', v')}
      R=R∪{v'}
      P=P\Pᵥ
  else
    P=P†{(u, r)}
    Q=Q∪{(u, r)}
if (Q is not empty)
  w=new Internal Node
  w.test=test
  V=V∪{w}
  ∀(u, r) ∈ Q
    E=E∪{(u, r, w)}
  R=R∪{w}
if (result=TRUE)
  ∀u ∈ R
    TSet=TSet∪{(v, T)}
    F_φ Set=F_φ Set∪{(v, F_φ)}
  else
  ∀v ∈ R
    TSet=TSet∪{(v, F)}
    F_φ Set=F_φ Set∪{(v, T_φ)}
return [TSet, F_φ Set]
```

A new subscription is added to the DAG "G" by the following function. The predicate specified by the new subscriber is added to the DAG at the root. A leaf node corresponding to the new subscriber is added at all points in the DAG where the predicate evaluates to TRUE.

```
AddSubscription(G, sub)
  let P=sub.predicate
  [TSet, F_φ Set]=ProcessPredicate(P, {G.root, T})
  /* Create a new leaf node */
  v=new Leaf Node
  v.sub=sub
  V=V∪{u}
  ∀(u, r) ∈ TSet
    E=E∪{u, r, v}
```

The above disclosure provides many different embodiments, or examples, for implementing different features of the invention. Specific examples of components, and processes are described to help clarify the invention. These are, of course, merely examples and are not intended to limit the invention from that described in the claims. All systems that support content-based subscription i.e. allowing subscribers to specify predicates over the content of events as subscription filters, would require an efficient means for matching subscribers with events. These systems, for example, could include messaging systems like the Java Message Service, event notification services, semantic multicast systems. The above described technique could conceivably be used in all the above scenarios. While the invention has been particularly shown and described with reference to the preferred embodiment thereof, it will be understood by those skilled in the art that various changes in form and detail may be made therein without departing from the spirit and scope of the invention, as set forth in the following claims.

What is claimed is:

1. A method for matching a published event with one or more subscribers in a content-based publish-subscribe system in a computer network, each subscriber having one or more predetermined predicates, the method comprising:

creating a virtual Direct Acyclic Graph (DAG) including one or more arbitrary boolean tests representing the predetermined predicates;

eliminating, upon publishing the event, one or more subscribers, at least one of whose predicates is not satisfied while the DAG is traversed; and identifying at least one matching subscriber if all the predicates of the matching subscriber are satisfied, wherein the DAG has a root node, one or more leaf nodes representing subscribers, and one or more non-leaf nodes representing the boolean tests which are formed by boolean connectors and wherein the step of creating further includes constructing the DAG in a top-down fashion so that common predicates shared by the subscribers are examined first and a minimal number of boolean tests are conducted to identify the matching subscribers.

2. The method of claim 1 further includes, when a new subscriber is added, adding the new predicates of the new subscriber to the DAG recursively starting from the root node, and adding a leaf node at any node in the DAG where the boolean test at the node is satisfied.

3. The method of claim 1 wherein each non-leaf node directs toward other leaf nodes or non-leaf nodes based on the results of the boolean test at the non-leaf node.

4. The method of claim 3 wherein the boolean test result is one of True, False, or Null.

5. The method of claim 1 wherein the boolean connectors are AND, OR, NOT and parenthesis.

6. The method of claim 1 wherein the predetermined predicate includes an atomic test, a disjunction of sub predicates, a conjunction of sub predicates, or a negation of a sub predicates.

7. A computer program for matching a published event with one or more subscribers in a content-based publish-subscribe system in a computer network, each subscriber having one or more predetermined predicates, the program comprising programs for:

creating in a top-down fashion a virtual Direct Acyclic Graph (DAG) including one or more arbitrary boolean tests representing the predetermined predicates so that common predicates shared by the subscribers are examined first and a minimum number of boolean tests are thus conducted to identify the matching subscriber;

eliminating, upon publishing the event, one or more subscribers wherein at least one of whose predicates is not satisfied while the DAG is travesed; and identifying at least one matching subscriber if all the predicates of the matching subscriber are satisfied, wherein the DAG has a root node, one or more leaf nodes representing subscribers, and one or more non-leaf nodes representing the boolean tests formed by boolean connectors.

8. The program of claim 7 wherein the program for creating further includes, when a new subscriber is added, adding the new predicates of the new subscriber to the DAG recursively starting from the root node, and adding a leaf node at any node in the DAG where the boolean test at the node is satisfied.

9. The program of claim 7 wherein each non-leaf node directs toward other leaf nodes or non-leaf nodes based on the test result at the non-leaf node.

10. The program of claim 9 wherein the test result is one of True, False, or Null.

11. The program of claim 7 wherein the boolean connectors are AND, OR, NOT and parenthesis.

12. The program of claim 7 wherein the predicate includes an atomic test, a disjunction of sub predicates, a conjunction of sub predicates, or a negation of a sub predicates.

* * * * *